Oct. 25, 1966

J. F. LILL

3,281,084

DEVICE FOR SHAPING AND POSITIONING
DYNAMOELECTRIC MACHINE END TURNS

Filed April 25, 1963

INVENTOR.
John F. Lill,
BY Hood, Gust & Irish
Attorneys.

Oct. 25, 1966 J. F. LILL 3,281,084
DEVICE FOR SHAPING AND POSITIONING
DYNAMOELECTRIC MACHINE END TURNS
Filed April 25, 1963 7 Sheets-Sheet 2

INVENTOR.
John F. Lill,
BY Hood, Gust & Irish
Attorneys.

INVENTOR.
John F. Lill,
BY Hood, Gust & Irish
Attorneys.

Oct. 25, 1966

J. F. LILL

3,281,084

DEVICE FOR SHAPING AND POSITIONING
DYNAMOELECTRIC MACHINE END TURNS

Filed April 25, 1963

INVENTOR.
John F. Lill,
BY Hood, Gust & Irish
Attorneys.

Oct. 25, 1966 J. F. LILL 3,281,084
DEVICE FOR SHAPING AND POSITIONING
DYNAMOELECTRIC MACHINE END TURNS
Filed April 25, 1963 7 Sheets-Sheet 6

INVENTOR.
John F. Lill,
BY Hood, Gust & Irish
Attorneys.

3,281,084
DEVICE FOR SHAPING AND POSITIONING
DYNAMOELECTRIC MACHINE END TURNS
John F. Lill, Fort Wayne, Ind., assignor to Fort Wayne
Tool & Die, Inc., Fort Wayne, Ind., a corporation of
Indiana
Filed Apr. 25, 1963, Ser. No. 275,544
20 Claims. (Cl. 242—1.1)

This invention relates generally to machines and methods for winding coils into internally slotted dynamoelectric machine core members, and more particularly to devices and methods for shaping and positioning the end turns of such coils.

Gun-type stator winding machines are well known in the art, conventionally comprising a winding head or gun having a wire dispensing needle on its outer surface, the head being moved reciprocally through the bore of the stator to be wound and also having limited rotational movement imparted thereto adjacent the ends of its stroke. Movement of the gun through the stator bore in one direction thus carries a wire therethrough to form one side of the coil with the rotational movement of the gun at the end of this stroke forming one end turn; the next axial motion of the gun in the opposite direction back through the bore forms the other side of the coil and finally the next rotational movement of the gun restores the wire dispensing needle to its original position forming the other end turn thus completing one turn of the coil being wound. Such a gun-type stator winding machine is described and illustrated in Patent No. 3,025,008 to Richard G. Nill and Robert J. Eminger and assigned to the assignee of the present application.

Numerous arrangements, such as various hooks and shroud members, have been employed in gun-type winding machines in order properly to form the end turns of the coils. The shrouds commonly employed in such machines have conventionally comprised a pair of shoud members respectively secured to the opposite end faces of the stator core member being wound and extending axially outwardly therefrom, each such shroud member having an enlarged bulb portion formed on the end thereof spaced from the end face of the stator core member and forming a radially outwardly facing slot of fixed width therewith. With this arrangement, the wire dispensing needle on the winding gun moves outwardly from the bore of the stator core member carrying the wire past a side of the respective shroud member, the rotation of the gun at the end of its stroke thus causing the wire to form a loop around the respective bulb portion; subsequent axial movement of the gun and the wire dispensing needle back through the stator bore thus pulls the wire loop along the outer surface of the bulb and into the shroud slot to form an end turn at the respective end face of the stator core member.

It has been customary to use gun-type winding machines with such shrouds for winding stator core members of the distributed winding type, i.e., comprising a plurality of pole-groups of concentrically arranged coils, each coil in a given group having a different pitch. When winding such stator core members, the coil having the smallest pitch is wound first and the coils of progressively greater pitch are then sequentially wound. With conventional shroud members having a fixed bulb defining a slot of fixed width with the respective end face of the stator core member, the end turns of the first coil to be wound of a given pole group, i.e., the smallest pitched coil, tend to accumulate in the slot adjacent the stator end face, and the end turns of the coils of progressively greater pitch tend to accumulate in the slot generally axially outwardly therefrom. However, since there is no control over the positioning of the end turns of each coil in the slot, some at least of the end turns of subsequently wound coils will tend to overlay the end turns of previously wound coils. Furthermore, as the higher pitched coils are wound, the slot begins to confine the end turns of the coils causing a tendency for the end turns of these coils to pile up at the forward side of the slot adjacent the bulb portion of the shroud member. This tendency is especially prevalent as the end turns become more and more confined by the fixed width of the shroud slot, and may result in the end turns of the higher pitched coils entirely overlaying the end turns of previously wound coils of lesser pitch including the end turns of the smallest pitched coil. In addition, since the end turns are in essence random wound, they are not tightly compacted in the minimum cross-sectional area thus increasing the mean turn length and providing a tendency for the end turns to spring back, both inwardly and outwardly.

It is common practice to connect the coils of individual pole groups electrically in series and thus when the dynamoelectric machine is energized, a substantial potential gradient may exist between the smallest pitched coil and the largest pitched coil. Thus, when the end turns of the highest pitched coil overlay and contact the end turns of the smallest pitched coil, the possibilities of arc-over between these end turns is substantially increased. Furthermore, the above-mentioned tendency for the end turns of the highest pitched coil to pile up on the side of the slot toward the bulb portion of the shroud member frequently results in the end turns having an excessive outside diameter and the further tendency, particularly in the case of two-pole machines for the end turns to spring inwardly toward the bore. The excessive outside diameter and tendency for the end turns to spring inwardly has thus required, as a separate operation following winding of the stator core member, forming of the end turns which not only is an additional and difficult operation, but which also in turn tends to roll the end turns one over the other, resulting in stretching and bending of the end turns and abrasion of the insulation thereon.

Simply stated, the foregoing difficulties which have been encountered with prior shroud members having fixed bulb portions are attributable to the fact that there has been no control over the location of the end turns of the individual coils of progressively greater pitch.

The above-described difficulties which have been encountered with the end turns of concentric coils of machine-wound stator core members may be substantially reduced by shaping the end turns of each coil into generally rectangular cross-section, and arranging the end turns of the coils of progressively greater pitch in axial alignment, and in fact this is the common practice in the case of larger dynamoelectric machines employing preformed coils. However, to the best of the present applicant's knowledge and belief, such shaping and positioning of the end turns of the coils of progressively greater pitch has not heretofore been possible in the case of stator core members machine wound with gun-type winding machines employing conventional end turn shaping devices.

It is accordingly an object of the invention to provide an improved end turn shaping and positioning device for use with a machine for winding concentric coils of progressively greater pitch into the slots of an internally slotted dynamoelectric machine stator core member which will shape the end turns of each coil into generally rectangular cross-section and position the end turns of the coils of progressively greater pitch in axial alignment.

Another object of the invention is to provide a method of shaping the end turns of the coils of an internally slotted dynamoelectric machine stator core member into generally rectangular cross-section and positioning the same in axial alignment.

A further object of the invention is to provide a method and apparatus for shaping and positioning the end turns of dynamoelectric machine coils of progressively greater pitch as they are being wound to limit the tendency of the wound end turns to spring back toward the bore.

Yet another object of the invention is to provide a method and apparatus for controlling the shape and position of the end turns of each successively wound coil thereby to compact and reduce the total end turn cross-section and to reduce cross-over of end turns of different coils and mean turn length.

Further objects and advantages of the invention will become apparent by reference to the following description and the accompanying drawings, and the features of novelty which characterize the invention will be pointed out with particularity in the claims annexed to and forming a part of this specification.

In accordance with the broader aspects of the invention, an end-turned shaping and positioning device is provided comprising a member adapted to be secured to the stator core member to be wound and having a part which extends axially outwardly from the end face of the core member. Means are provided on the part forming a radially outwardly facing slot of selectively adjustable axial width for accommodating and shaping the end turns of the coils into generally rectangular cross-section. With this arrangement, a first radially outwardly facing slot is provided adjacent the end face of the stator core member for accommodating and shaping the end turns of the smaller pitched one of the coils into generally rectangular cross-section. Thereafter, another radially outwardly facing slot is provided adjacent the end turns of a first coil for accommodating and shaping the end turns of a larger pitched one of the coils into generally rectangular cross-section with the result that the end turns of the coils of progressively greater pitch are positioned in axial alignment. This results in the total wound end turns being tightly compacted in the minimum cross-sectional area but nevertheless divided into discrete non-overlaying coil sections thus substantially eliminating cross-over of end turns of different coils, limiting the spring back tendency and reducing the mean turn length.

In accordance with the method of the invention, a first radially outwardly facing slot is provided adjacent one end face of the stator core member and a first coil is wound into the core member with the end turns thereof at the one end face passing through the first slot until the end turns substantially fill at least a portion of the slot extending across the entire width thereof so that the end turns of the first coil have a generally rectangular cross-section. Thereafter, a second radially outwardly facing slot is provided adjacent the end turns of the first coil and a second coil of greater pitch is wound into the core member with the end turns thereof at the one end face of the core passing through the second slot until the end turns of the second coil substantially fill at least a portion of the second slot extending across the entire width thereof whereby the end turns of the second coil also have a generally rectangular cross-section and axially abut and are in axial alignment with the end turns of the first coil.

In the drawings:

FIG. 9A is a fragmentary cross-sectional view illustrating the positioning of the end turns resulting from the use of the shroud member of FIGS. 1, 2 and 3;

FIG. 9B is a fragmentary developed top view of the end turns of FIG. 9A;

Referring now to FIGS. 1, 2, 3, 6, 7 and 8, there is shown a conventional laminated, internally slotted, dynamoelectric machine stator core member 20; a core member 20 is shown as having twenty-four winding slots 22 extending radially outwardly from the bore 24 for accommodating the coils of a conventional two-pole winding, each pole comprising four concentric coils of progressively greater pitch, it being understood, however, that the invention is equally applicable to stator core members having a greater number of poles. In the illustrated embodiment, a conventional slot liner or insulator 26 is positioned in each of the slots 22 and has a cuff portion 28 extending outwardly at each end face 30, 32 of the core 20. One of the improved shroud devices of the invention, generally identified at 34 is provided for each pole group of coils to be wound on stator core member 20 (two in the case of a two-pole machine). Each of the shroud devices 34 comprises a center portion 36 which extends through the bore 24 of the core member 20 and having elongated shank portions 38, 40 respectively joined to its opposite ends and extending axially outwardly therefrom. Mounting members 42, 44 extend radially outwardly from the inner ends of the shank portions 38, 40 over the cuff portions 28 of the slot liners 26 and the end faces 30, 32 of the core 20, as shown. The mounting members 42, 44 are respectively secured at their outer ends to rings 46, 48, and this entire assembly is secured to the winding machine, which may be of the type shown in aforesaid Patent No. 3,025,008.

Figure 2:
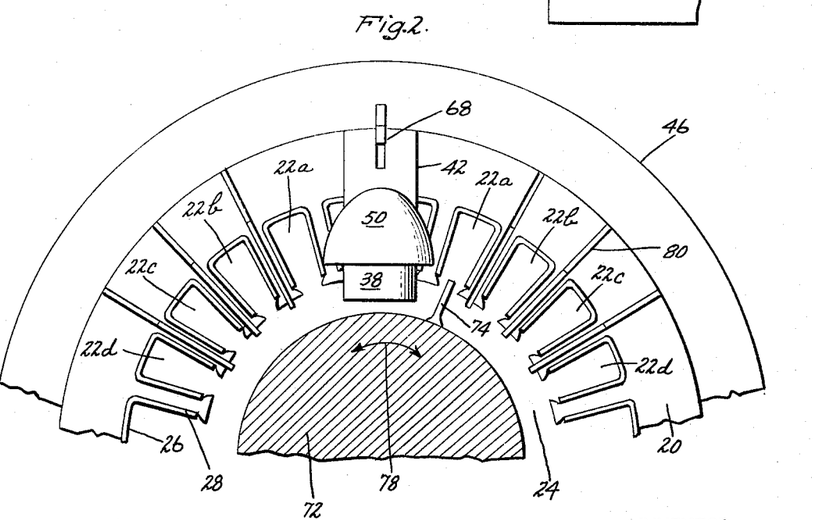
FIG. 2 is an end view, partly in cross-section, illustrating the embodment of FIG. 1.
Figure 3:
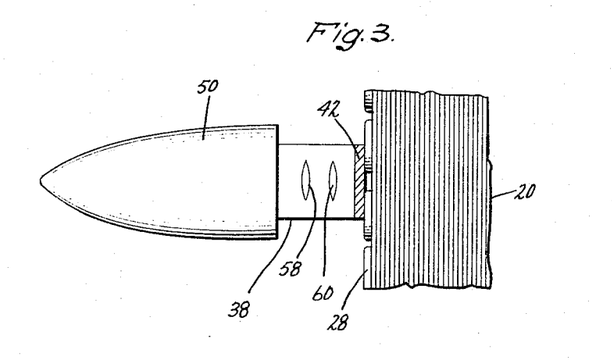
FIG. 3 is a fragmentary top view of the embodiment of FIGS. 1 and 2.

Referring particularly to FIG. 2, the twenty-four slot stator core member 20 shown is intended to be wound as a two-pole machine with four coils for each pole group, the smallest pitched coil of one of the groups being wound in slots 22a, the next largest pitched coil in slots 22b, the next-to-largest pitched coil in slots 22c, and the largest pitched coil in slots 22d. It will be seen that shroud device 34 for this pole group is disposed between slots 22a (which are spaced apart by two slots), and that the shank portions 38, 40 of mounting portion 36 and mounting members 42, 44 have a transverse width less than the pitch of slots 22a and thus the smallest pitched coil to be wound therein.

Figure 1:
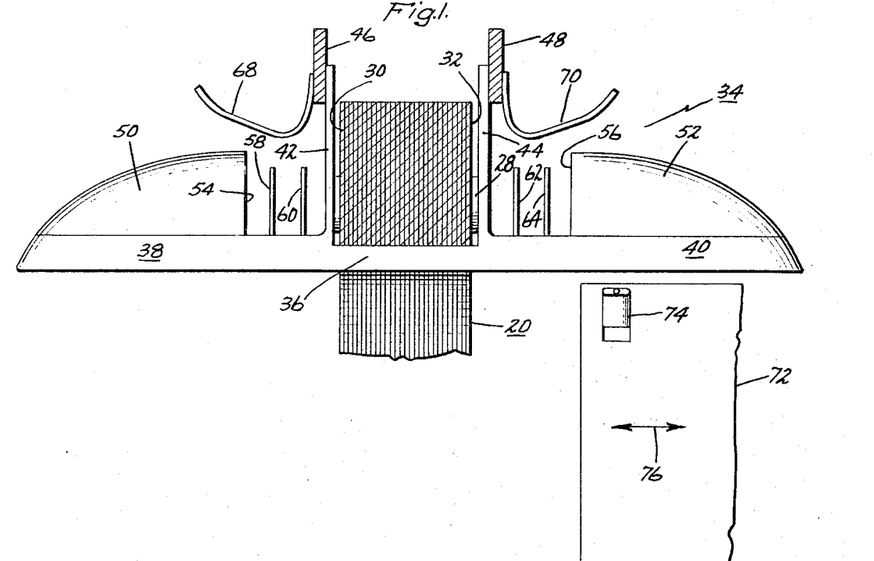
FIG. 1 is a side elevational view, partly in cross-section, illustrating one embodiment of the invention.

Each of the shank portions 38, 40 has an enlarged bulb member 50, 52 adjustably mounted thereon for selective axial movement toward and away from end faces 30, 32 of the stator core member 20, for a reason to be hereafter more fully described. Bulb members 50, 52 respectively have flat rear surfaces 54, 56 which respectively define radially outwardly facing slots of selectively adjustable width with the radially outer surfaces of the shank portions 38, 40 and the mounting members 42, 44. In FIG. 1, bulb members 50, 52 are shown in their outermost positions.

Figures 6, 7, 8, 9:
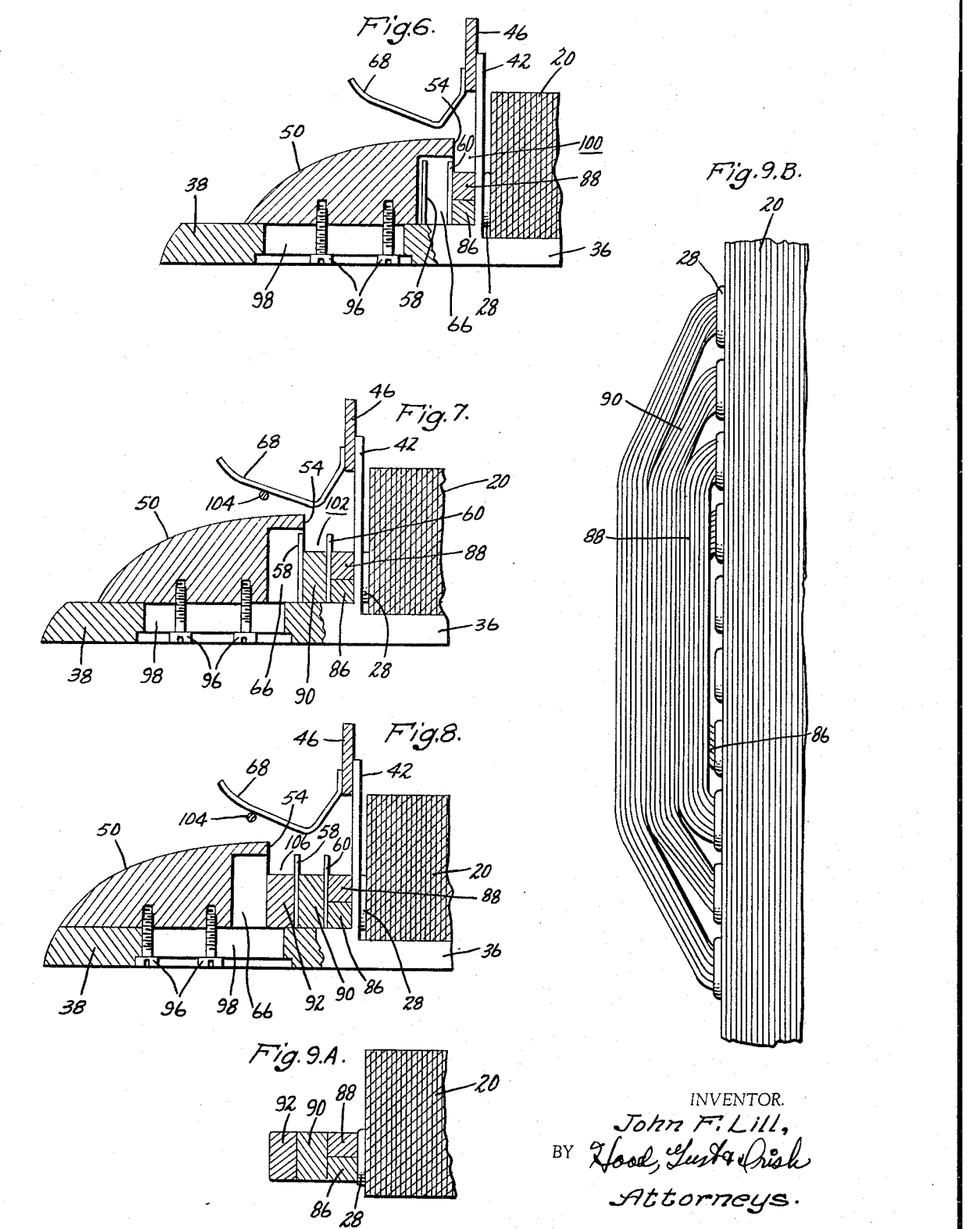
FIG. 6 is a fragmentary cross-sectional view illustrating the formation of the end turns of smaller pitch with the shroud member of FIGS. 1, 2 and 3.
FIG. 7 is a cross-sectional view showing the formation of the end turns of a coil of larger pitch with the shroud member of FIGS. 1, 2 and 3.
FIG. 8 is a cross-sectional view illustrating the formation of the end turns of the coil of largest pitch with the shroud member of FIGS. 1, 2 and 3.

In the illustrated embodiment, each of the shank portions 38, 40 has a pair of axially thin, axially spaced-apart, radially outwardly extending blade or wire stop members 58, 60 and 62, 64 thereon for a purpose to be hereinafter more fully described. These blade members are accommodated within cavities 66 formed in the bulb members 50, 52 and communicating with the rear surfaces 54, 56, when the bulb members are moved axially inwardly toward the core member 20, as best seen in FIGS. 6, 7, and 8.

A pair of leaf spring wire deflectors 68, 70 are provided respectively having one end secured to the rings 46, 48 and having their free ends extending outwardly over the bulb members 50, 52 as shown.

The winding machine is provided with a conventional winding gun 72 having wire dispensing needles 74 thereon corresponding in number to the number of pole groups to be wound. Gun 72 is adapted to be moved reciprocably through the bore 24 of the stator core 20, as shown by the arrows 76, and to be oscillated at the ends of its stroke, as shown by the arrows 78; these motions may be imparted to the gun 72 by the mechanism shown by the aforesaid patent No. 3,025,008. Thus, in operation, gun 72 will move through the bore 24 of the core 20 in one direction with the wire dispensing needle 74 passing through one slot in which a coil is being wound, such as one of the slots 22a. When the needle 74 reaches a position axially beyond one end of the shroud device 34, the gun is rotated thereby looping the wire around the outer end of the respective bulb member 50, 52. The gun then moves back through the bore 24 with the needle 74 moving through the other slot 22a and when the needle 74 reaches a point axially beyond the other end of the shroud device 24, it is rotated again back to its initial position to complete one turn of the coil being wound.

In order properly to form and retain the end turns of the larger pitched coils, conventional segmental shroud members 80 are mounted between slots 22a and 22b, 22b and 22c, and 22c and 22d, as shown in FIG. 2.

Figure 4:
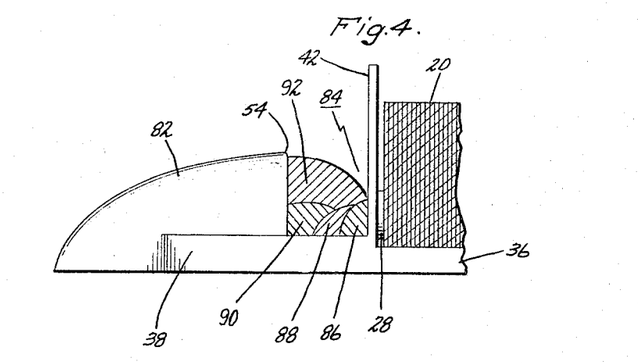
FIG. 4 is a fragmentary side view, partly in cross-section, illustrating a prior shroud member and the positioning of the end-turns thereon.

Referring now to FIG. 4 in which like numbers are indicated by like reference numerals, conventional shroud devices have incorporated a fixed bulb portion 82 secured to shank portion 38 and defining a radially outwardly facing slot 84 of fixed axial width between rear flat surface 54, the radially outer surface of shank portion 38 and mounting member 42. Assuming now that four concentric coils 86, 88, 90, and 92 of progressively greater pitch are wound with the conventional shroud device of FIG. 4, due to the progressively increasing arc defined by the end turns of the coils of progressively greater pitch, some of the end turns of coil 88 will overlie and engage the end turns of coil 86, some of the end turns of coil 90 will overlay and engage the end turns of coil 88, and the end turns of coil 92 will tend to pile up toward the flat surface 54 of the bulb 82 and to overlay the end turns of all of the smaller pitched coils 90, 88, and 86, as shown.

Figure 5:
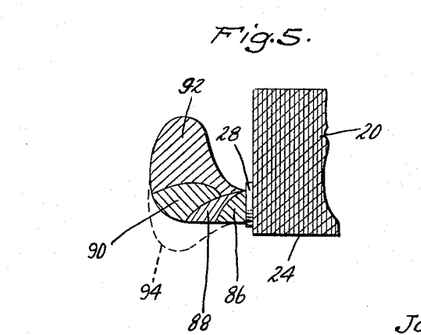
FIG. 5 is a fragmentary cross-sectional view illustrating the positioning of the end turns resulting from the use of the shroud member of FIG. 4.

When the conventional shroud device of FIG. 4 is removed from the core 20, the end turns of the coils 86, 88, 90 and 92 will tend to have a cross-sectional configuration as shown in FIG. 5 and it will be readily seen that by virtue of the piling up of the end turns of the largest pitched coil 92, the end turns may have an excessive outside diameter, i.e., too closely spaced radially from the shell within which core 20 is positioned. Further, it will be seen that some of the end turns of the largest pitched coil 92 overlay and engage the end turns of the smallest pitched coil 86 thus leading to the tendency for arc-over to occur between these end turns, as above described. It will also be seen that since the end turns are wound under tension, an inherent spring force is provided tending to move the end turns inwardly into the bore 24, as shown by the dashed lines 94; attempts to form and shape the end turns both radially outwardly away from the bore and radially inwardly to reduce the overall radial height thereof results in the end turns, particularly of the largest pitched coil 92, rolling one over the other stretching some, loosening others, and bending some at the point where they exit from the core slots. The above described and illustrated problem encountered with the use of conventional shroud devices, while present to some degree in many stator core members, is particularly accentuated in in the case of two-pole machines because of the substantial arc defined by the end turns of the higher pitched coils.

Referring now to FIGS. 6, 7, and 8, in the illustrated embodiment, bulb members 50, 52 are adjustably mounted on the radially outer surfaces of shank portions 38, 40 for selective axial movement thereon by means of suitable threaded fasteners 96 seated in axially elongated slot 98.

When it is desired to wind the smallest pitched coil 86 (and also in the illustrated embodiment the next coil 88), bulb members 50, 52 are moved to their innermost positions with the blade members 58, 60 and 62, 64 disposed entirely within the cavities 66 so that the flat surfaces 54, 56 define first radially outwardly facing slots 100 with the radially outward surfaces of the shank portions 38, 40 and the mounting members 42, 44. The smallest pitched coil 86 is then wound in the conventional fashion and it will be seen that the end turns substantially fill a portion of the slot 100 extending across its entire width and are thereby formed or shaped into a generally rectangular cross-section. The second coil 88 may then be wound and it will be seen that its end turns are likewise positioned in the slot 100 over the end turns of coil 86 and again shaped into a generally rectangular cross-section. In the illustrated embodiment, the end turns of the smaller pitched coils 86, 88 are shown as being wound in the same slot 100 defined by the movable bulb members 50, 52 since generally these coils have fewer turns than do the coils 90 and 92 of greater pitch.

At the completion of the winding of the coils 86, 88, the bulb members 50, 52 are then moved to their intermediate positions as shown in FIG. 7. Here, the outermost blade members 58, 64 are disposed within the cavity 66 in the bulb members 50, 52 and the flat surfaces 54, 56 now define radially outwardly facing slots 102 with blade members 60, 62 and the end turns of the previously wound coils 86, 88. The next coil 90 is then wound into the slot 102, it being observed that the end turns of this coil likewise substantially fill a portion of the slot 102 extending substantially across its axial width and are thus formed or shaped into a generally rectangular cross-section.

In all except the innermost positions of the bulb members 50, 52 the wire deflector members 68 serve to deflect the end turn of the coil being wound into the effective slot as shown at 104.

When the coil 90 has been completely wound, the bulb members 50, 52 are then moved to their outermost positions with the flat surfaces 54, 56 now defining radially outwardly extending slots 106 with the blade members 58, 64. The highest pitched coil 92 is then wound with its end turns being deflected into slots 106 by wire deflectors 68, 70, the end turns of coil 92 likewise substantially filling the portion of slots 106 extending substantially across their axial widths and, in common with the end turns of coil 90, being shaped or formed into a generally rectangular configuration, as shown.

When winding of the coils has been completed, the shroud devices 34 are then removed and it will be seen by reference to FIG. 9A that the end turns of the coils 86, 88, 90, and 92 respectively retain their generally rectangular cross-sectional configuration and are disposed in their desired axially extending alignment.

Figure 10:
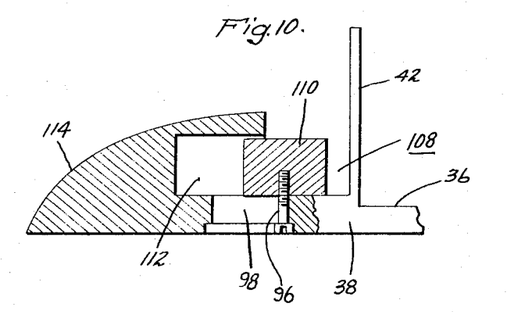
FIG. 10 is a fragmentary cross-sectional view illustrating another embodiment of the invention.

Reference to FIG. 9B shows, in developed form, the resulting configuration of the end turns of the coils 86, 88, 90, and 92. Referring now to FIG. 10 in which like elements are still indicated by like reference numerals, another embodiment of the invention is shown wherein the end turn accommodating and shaping slot 108 of selectively adjustable width is provided by means of an axially adjustable shaping member 110 adjustably mounted on the shank portion 38 by means of screw 96 and slot 98, a shaping member 110 being accommodated within cavity 112 in fixed bulb member 114.

Figure 11:
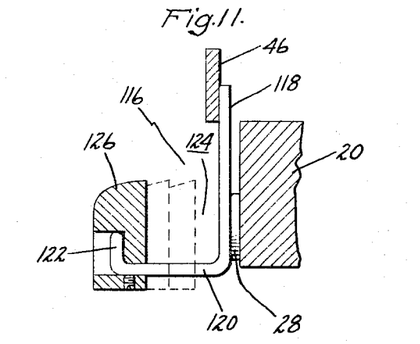
FIG. 11 is a fragmentary cross-sectional view illustrating yet another embodiment of the invention.
Figure 12:
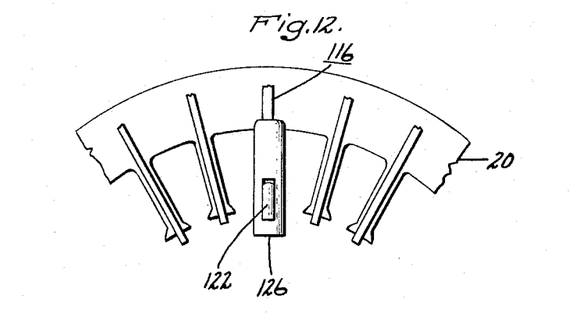
FIG. 12 is a fragmentary end view of the embodiment of FIG. 11.

Referring now to FIGS. 11 and 12 in which like elements are still indicated by like reference numerals, embodiment of the invention is shown adapted for use with end turn forming hooks 116. Hook members 116 are respectively provided with radially outwardly extending mounting portions 118 and axially outwardly extending portions 120 having hook portion 122 formed on the ends thereof. In order to provide the end turn forming and shaping slot 124 of selectively adjustable width, a shaping member 126 is provided adjustably mounted on the portion 120 of the hook member 116, as shown. In this embodiment, the selectively adjustable end turn shaping member 126 may be provided not only on the center one of the hook members 116 (with respect to the coils forming a given pole group), but additional ones of the hook members 116 may also have the adjustable shaping members 126 mounted thereon.

Referring now to FIGS. 13 through 17 in which another embodiment of the invention is illustrated and in which like elements are still indicated by like reference numerals, there is shown an arrangement for simultaneously moving the adjustable bulb members 50, 52 from their innermost to their outermost positions. Here, the bulb members 50, 52 are mounted on the shank portions 38, 40 for axial movement by means of projections 128 seated in grooves 130 and engaging guide rods 132, as shown. Here also nest plate 134 is shown which supports the core and shroud device assembly upon the winding machine.

Figures 13, 14, 15:
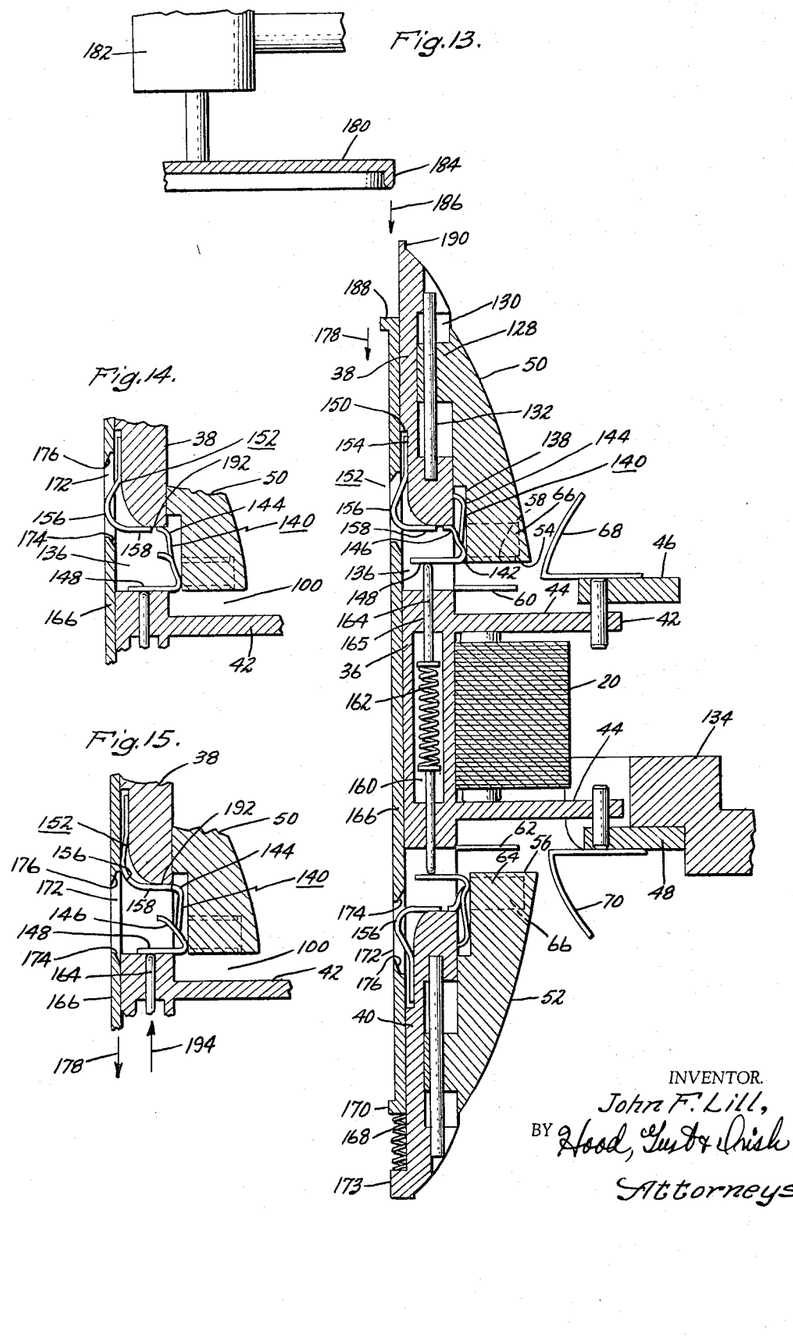
FIG. 13 is a cross-sectional view illustrating another embodiment of the invention.
FIGS. 14, 15 and 16 are fragmentary cross-sectional views illustrating the mode of operation of the embodiment of FIG. 13.

Each of the shank portions 38, 40 has an opening 136 formed therethrough from its radially inner to its radially outer surface and each of the bulb members 50, 52 has a recess 138 formed in its inner surface and communicating with the flat surfaces 54, 56.

A pair of leaf spring bulb lock members 140 are provided respectively positioned in the openings 136 and recesses 138, as shown, and respectively secured to the bulb members 50, 52, as by welding at 142. Each of the leaf spring bulb lock members 140 has, in the illustrated embodiment, two leaf spring finger portions 140, 146 and an actuator portion 148 which extends downwardly into the respective opening 136.

Each of the shank portions 38, 40 has a recess 150 formed in its radially inner surface communicating with the opening 136. A pair of leaf spring elements 152 are provided having one end positioned in the respective recess 150 and secured to the respective shank portion 38, 40, as by welding at 154. Each of the leaf spring elements 152 has a loop portion 156 which extends radially inwardly from the inner surface of the respective shank portion 38, 40 and a free end 158 which extends radially outwardly in the respective opening 136.

A cavity 160 is formed in the mounting portion 36 within which actuator spring 162 is positioned. Openings 165 respectively communicate between the openings 136 in the shank portions 38, 40 and the cavity 160 and actuator members 164 extend through these openings respectively bearing against the spring 162 and the actuator portions 148 of the leaf spring members 140. It will now be seen that since the leaf spring members 140 are secured to the bulb members 50, 52, the bulb members 50, 52 are resiliently urged axially outwardly by means of the spring 162 urging the actuator elements 164 against the actuator portions 148.

An elongated actuator bar 166 is slidably mounted on the radially inner surface of the shank portions 38, 40 and the mounting portion 36 for axial movement, being biased to normal position by means of a suitable spring 168 bearing against end 170 of the actuator bar 166 and abutment 173 on shank portion 40. Actuator bar 166 has a pair of openings 172 formed therein into which the loop portions 156 of the leaf spring elements 152 normally respectively extend, as shown. Openings 172 in the actuator bar 166 respectively have beveled cam surfaces 174, 176 as shown.

Actuator bar 166 is axially moved from its normal position as shown in FIG. 13 in the direction shown by the arrow 178 by means of an actuating member 180 which in turn is actuated by a suitable hydraulic cylinder 182 mounted on the winding machine. Actuating member 180 has an annular flange 184 which is moved downwardly as shown by the arrow 186, responsive to actuation of the hydraulic cylinder 182, so as to engage end 188 of the actuator bar 166 thereby to move it axially in a direction shown by the arrow 178 against the force of the return spring 168. It will be readily understood that in its normal position, actuating element 180 is sufficiently spaced from the end 190 of the shroud device so as to permit normal operation of the gun 72.

Figure 17:
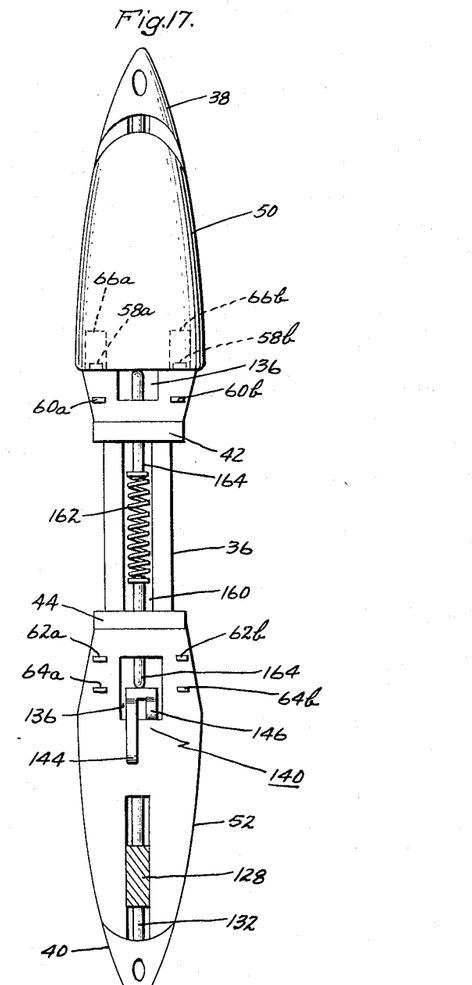
FIG. 17 is a top view of the shroud device of FIG. 13.

Referring particularly to FIG. 17, it will be observed that the blade members are provided in pairs 58a and 58b, 60a and 60b, 62a and 62b, and 64a and 64b respectively disposed on opposite sides of the openings 136, the recesses 66 in the bulb members 50, 52 likewise being provided in pairs 66a and 66b respectively disposed on opposite sides of the openings 136 in the shank portions 38, 40.

Referring now particularly to FIG. 14, when the bulb members 50, 52 are in their innermost positions defining the first radially outwardly facing slots 100, as above described, it will be seen that the spring finger portion 144 of the bulb lock member 140 engages the forward side 192 of the opening 136 in the shank portions 38, 40 thereby locking the bulb members 50, 52 in their innermost positions.

When it is desired to move the bulb members 50, 52 to their second positions (as shown in FIG. 13) actuator bar 166 is moved axially in the direction 178, as above described. This causes the cam surfaces 174, 176, respectively, of the openings 172 in the actuator bar 166 to engage the loop portions 156 of the leaf spring elements 152 thereby camming the same radially outwardly so that their free ends respectively engage leaf spring portions 144 of the locking members 140 biasing them out of engagement with the forward sides 192 of the openings 136 in the shank portions 138, 140. This permits spring 162 acting upon actuator members 164 and in turn upon actuator portions 148 of the locking members 140 to move the bulb members 50, 52 axially outwardly in the direction shown by the arrow 194 to their second positions in which the leaf spring portions 146 engage end surfaces 192 of the openings 136 thereby locking the bulb members 50, 52 in their second positions. It will be understood that return of the actuating member 180 to its normal position by the hydraulic cylinder 182, as shown in FIG. 13, permits the return spring 168 to return the actuator bar 166 to its normal position, in turn permitting the leaf spring elements 152 to return to their normal positions, as shown in FIG. 13.

When it is desired to move the bulb members 50, 52 to their axially outermost positions, actuator bar 166 is again actuated as above described, causing the free ends 158 of the leaf spring elements 152 to engage leaf spring portions 146 of the lock members 140 urging them out of engagement with the end surfaces 192 of the openings 136

244 outwardly to the position shown by means of a suitable coil spring 284 in the recess 282.

The end of pin 280 remote from the head 278 engages a suitable pin 286 slidably mounted in an opening extending through the mounting portion 36. Pin 286 in turn engages the end of pin 288 seated in a suitable opening in the shank portion 40. Pin 288 has a cam portion 290 formed thereon which cooperates with the releasing member 274 seated in opening 272 in shank portion 40. The end of cam portion 290 in turn engages the head 292 of pin 297 seated in recess 296 in the shank portion 40, being biased to its position as shown by suitable coil spring 298 which engages the end of guide rod 246. Guide rod 246 is secured in the opening 296 by means of a suitable pin 300.

Figures 20, 21, 22:
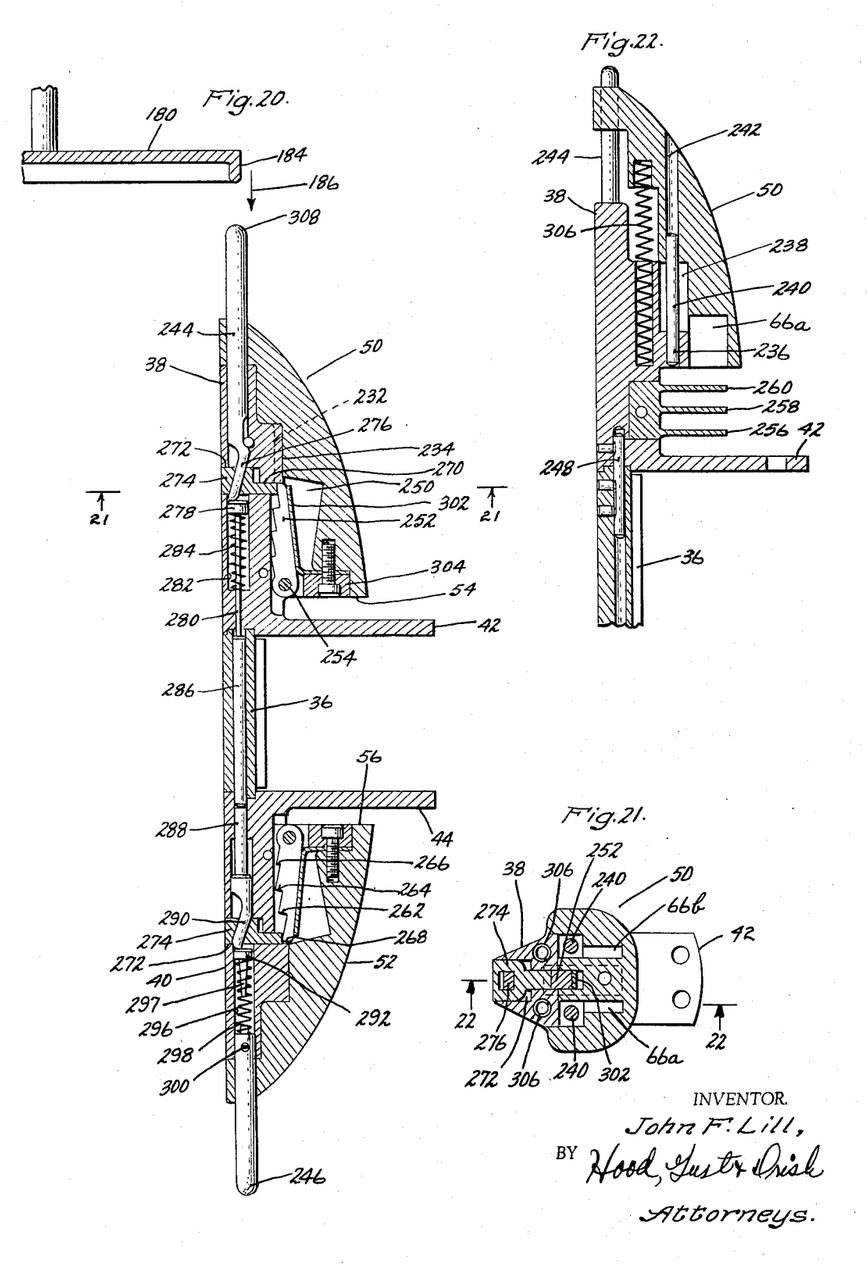
FIG. 20 is a cross-sectional view of a modfication of the embodiment of FIG. 13.
FIG. 21 is a cross-sectional view taken along the line 21—21 of FIG. 20.
FIG. 22 is a cross-sectional view taken along the line 22—22 of FIG. 21.

The bulb lock members 252 are biased downwardly to their positions shown in FIG. 20 by means of suitable leaf springs 302 secured to the bulb members 50, 52 by means of suitable removable plugs 304 mounted in suitable recesses in the rear surfaces 54, 56 of the bulb members 50, 52, as shown.

In the illustrated embodiment, the transversely spaced-apart blade members 256, 258 and 260 are respectively accommodated within axially extending slots 66a, 66b in the respective bulb members 50, 52 on either side of the recesses 250, as best seen in FIG. 21.

Assuming now that the bulb members 50, 52 are in their innermost positions, as shown in FIG. 20, with their rear surfaces 54, 56 respectively defining slots 100 with the mounting members 42, 44, it will be seen that the ends 268 of the bulb lock members 252 engage the end surfaces 270 of the shank portions 38, 40 thereby latching the bulb members 50, 52 in the positions shown; the bulb members 50, 52 are biased toward their outermost positions as shown in FIG. 22 by suitable coil springs 306, as best seen in FIG. 22. It will now be seen that when the actuating member 180 is moved downwardly as shown by the arrow 186, as above described in connection with FIG. 13, flange 184 will engage end 308 of the push rod 244 moving it downwardly. This downward movement of the push rod 244 causes the cam portion 276 to cam the respective releasing member 274 outwardly thereby to lift end 268 of bulb lock member 252 of the bulb member 50 outwardly away from its engagement with end 270 of shank portion 38 into the respective cavity 250. It will further be seen that the downward movement of the push rod 244 in the direction 186 likewise moves pins 280, 286, and 288 downwardly against the force exerted by springs 284 and 298 whereby the cam portion 290 of pin 288 cams the respective releasing member 274 of the bulb member 52 outwardly similarly to lift the respective bulb lock member 252 outwardly to release the engagement of its end 268 with end 270 of shank portion 40. When actuating member 180 is restored to its initial position, pins 280, 286, and 288 and push rod 244 are restored to their respective initial positions by springs 284 and 298 and the respective cam portions 276, 290 thus cam the releasing members 274 to their respective initial positions permitting the springs 306 to move the respective bulb members 50, 52 outwardly to their second positions in which the first steps 262 of the bulb lock members 252 respectively engage the edges 270 of the shank portions 38, 40.

It will now be seen that successive actuations of the push rod 244 by the actuating member 180 will successively release the bulb lock members 252 permitting the bulb members 50, 52 to be advanced successively outwardly by springs 306 to their outermost positions as shown in FIG. 20.

As in the case of an embodiment in FIG. 13, the bulb members 50, 52 may be manually restored to their inner positions as shown in FIG. 20 after the shroud assembly has been removed from the fully wound stator core member. It will further be understood that in any of the embodiments of the invention, any desired number of end turn-forming slots may be provided from two as in the embodiment of FIGS. 18 and 19 to four as in the embodiment of FIGS. 20, 21 and 22, or more if desired.

It will now be seen that there is provided in accordance with the invention a device and method for shaping and forming during the winding operation the end turns of concentric coils of a dynamo-electric stator core member into discrete generally rectangular cross-sectional configurations disposed in axial alignment, thereby substantially eliminating the above-described difficulties previously encountered in the machine winding of stator core members employing conventional shroud devices.

While I have illustrated and described specific embodiments of the invention, further modifications and improvements will occur to those skilled in the art and I desire therefore in the appended claims to cover all modifications which do not depart from the spirit and scope of my invention.

What is claimed is:

1. An end turn-shaping and positioning device for a winding machine for winding coils into an internally slotted dynamoelectric machine core member having an end face, said device comprising a member having means for securing the same to said core member and an elongated part extending axially outwardly from said end face, said part having a radially outwardly facing surface, a shaping member spaced from said end face and having a straight surface defining with said surface of said part a radially outwardly facing slot adjacent said end face for accommodating the end turns of said coils, and means mounting said shaping member on said part for selective axial movement thereon with respect to said end face thereby selectively to vary the axial width of said slot for shaping the end turns of each coil into generally rectangular cross-section for positioning the end turns of the coils of progressively greater pitch in axial alignment during the winding thereof.

2. A shroud device for a gun-type winding machine for winding at least two concentric coils of different pitch into an internally slotted dynamoelectric machine stator core member having an end face, said device comprising a member having means for securing the same to said core member and an elongated shank portion extending axially outwardly from said end face, said shank portion having a radially outwardly facing surface, said shank portion having a width less than the pitch of the smaller of said coils, a bulb member spaced from said end face and having a surface defining with said surface of said shank portion a radially outwardly facing slot adjacent said end face for accommodating the end turns of said coils, and means mounting said bulb member on said shank portion for selective axial movement thereon with respect to said end face thereby selectively to vary the axial width of said slot for shaping the end turns of each coil into generally rectangular cross-section and for positioning the end turns of the coils of progressively greater pitch in axial alignment during the winding thereof.

3. The device of claim 2 wherein said bulb member surface is flat and parallel with said end face.

Figure 16:
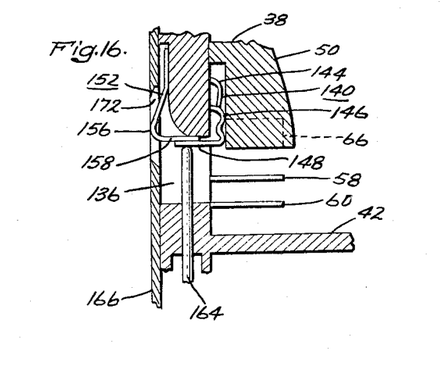

4. An end turn-shaping and forming device for a gun-type winding machine for winding at least two concentric coils of different pitch into an internally slotted dynamoelectric machine stator core member having a flat end face, said device comprising a member having means for securing the same to said core member and an elongated part extending axially outwardly from said end face, said part having a radially outwardly facing surface, a shaping member spaced from said end face having a straight surface parallel with said end face, and means mounting said shaping member on said part for selective axial movement between at least a first position with said straight surface defining with said surface of said part a first radially outwardly facing slot adjacent said end face for accommodating and shaping the end turns of the smaller pitched one of said coils into generally rectanin the shank portions 138, 140. Spring 162 and actuator members 164 bearing upon actuator portions 148 of the locking member 140 again move the bulb members 50, 52 axially outwardly to their outermost positions, this axial outwardly movement being limited by final engagement of the actuator portions 148 with the ends 158 of the leaf spring members 152, as shown in FIG. 16.

It will be readily understood that in order to restore the bulb members 50, 52 to their innermost positions, as shown in FIG. 14, it is merely necessary manually to push the bulb members inwardly, first the spring finger portions 146 and then the spring finger portions 144 engaging the end surfaces 192 of the slots 136; manual repositioning of the bulbs 50, 52 to their initial positions for a new winding operation is permissible since it will be recalled that the shroud devices are removed from the fully wound stator core member 20, and thus when removed, are in their outermost positions. It will be readily observed that the annular actuating member 180 can be employed simultaneously to actuate the actuator bar 166 of as many shroud devices as are employed in a given stator since the actuator bars 166 will be disposed upon a circle concentric within the bore 24 of the stator. It will thus be seen that the hydraulic cylinder 182 and the actuator member 188 are disposed concentrically with the bore of the stator and the winding gun 72.

Figures 18, 19:
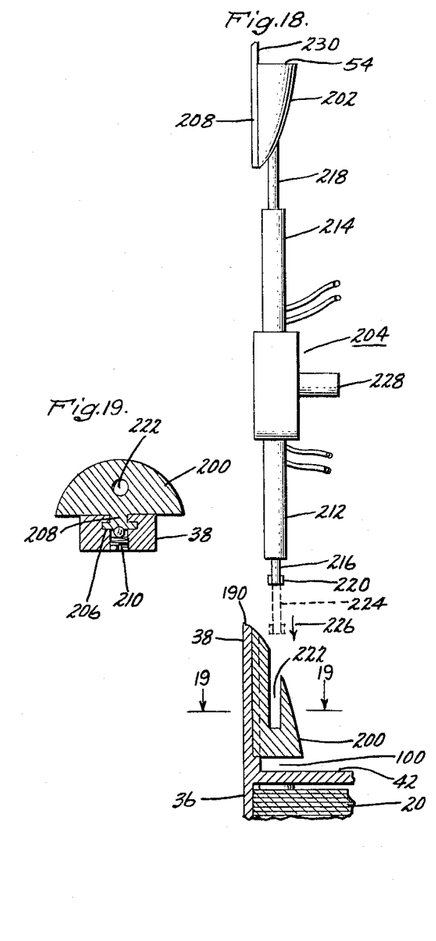
FIG. 18 is a fragmentary view, partly in section, illustrating yet another embodiment of the invention.
FIG. 19 is a fragmentary cross-sectional view taken along the line 19—19 of FIG. 18.

Referring now to FIGS. 18 and 19 in which like elements are still indicated by like reference numerals, there is shown another embodiment of the invention wherein the radially outwardly facing end turn-shaping slots are provided by shroud members 200, 202 of different axial lengths removably positioned on the shank portions 38, 40 by means of a turret mechanism 204. Here, each of the shank portions 38, 40 is provided with an axially extending slot or key-way 206 formed in its radially outer surface and each of the bulb members 200, 202 is provided with a cooperating projection or key 208 formed on its radially inner surface. It will be seen that the slots 206 and keys 208 cooperate to mount the bulbs 200, 202 on the shank portions 38, 40, the particular bulb being latched in operative position by means of a suitable detent mechanism 210.

Turret 204 is provided with a plurality of selectively actuable hydraulic cylinders 212, 214 respectively having piston elements 216, 218. Each of the selectively extensible and retractable piston elements 216, 218 is provided with a conventional hydraulically actuated chuck element 220 at the end thereof. Each of the bulb members 200, 202 is provided with an axially extending opening 222, as shown. The turret assembly 204 is positioned axially beyond end 190 of shank portion 38 and with the piston elements 216, 218 retracted, sufficient axial space is provided for normal winding operation of the winding gun 72.

Assuming now that the axially longest bulb member 200 is positioned upon the shank portion 38 thereby to define the first winding slot 100 and it is now desired to remove the bulb member 200 and to substitute therefore the axially shorter bulb member 202 thereby to define the second winding slot 102, hydraulic cylinder 212 is actuated thereby to extend an element 216 into the opening 222 into the bulb member 200, as shown by the dashed lines 224 and the arrow 226. When the piston element 216 is seated within the opening 222 in the bulb member 200, the chuck member 220 is hydraulically actuated thereby to engage the inner surface of the opening 222. Hydraulic cylinder 212 is then actuated to retract the piston element 216, carrying with it the bulb member 200 by virtue of the engagement of the chuck means 220 with the opening 222. When the bulb member 200 has thus been completely removed from the shank portion 38, the turret assembly 204 is rotated by means of shaft 228 to bring the bulb member 202 into alignment with the shank portion 38. Hydraulic cylinder 214 is then actuated to extend element 218 so as to move the bulb member 220 axially so that its key 208 is received within the keyway 206 in the shank portion 208 thus mounting the bulb member 202 thereon. The chuck means 220 on the piston element 218 having been released, the piston element 218 is retracted to leave the bulb member 202 mounted upon the shank portion 238. It will be seen that the key 208 of the bulb member 202 has an extension portion 230 at its rear end thereby to provide the proper axial spacing of the flat surface 54 of the bulb member 202 from the mounting member 42.

While the apparatus of FIGS. 18 and 19 has been shown as adapted selectively to position only two bulb members 200, 202 of different axial lengths on the shank portion 238, it will be readily comprehended that additional bulb members of different axial lengths may be selectively mounted upon and removed from the shank portion 38 by the provision of additional hydraulic cylinders 212, 214 on the turret assembly 204. It will further be readily understood that such a turret assembly will be required to be provided at each end of the shroud device in order selectively to position and remove the bulb members.

Referring now to FIGS. 20, 21, and 22 in which a preferred embodiment of the invention is illustrated and in which like elements are still indicated by like reference numerals, there is shown another construction in which the adjustable bulb members 50, 52 are simultaneously moved from their innermost to their outermost positions. Here, the bulb members 50, 52 are adjustably mounted on shank portions 38, 40 by means of grooves 232 which slidably engage the outer surfaces 234 of the shank portions, as shown, and also by means of transversely spaced apart projections 236 on the shank portions 38, 40 slidably received in complementary grooves 238 formed in the bulb members 50, 52 as best seen in FIG. 22. Guide pins 240 are respectively secured to the projections 236 and are slidably received in axially extending openings 242 respectively formed in the bulb members 50, 52. The bulb members 50, 52 are also slidably mounted on and guided by push rod 244 and guide rod 246, respectively, as shown.

In this embodiment, the mounting portion 36 is separately formed from the shank portions 38, 40 so that mounting portions of different lengths may selectively be provided in order to adapt the shroud assembly for use with stator core members having different stack heights. The mounting portion 36 is removably secured to the shank portions 38, 40 by means of suitable pins 248 and set screws, as best seen in FIG. 22.

Each of the bulb members 50, 52 has a recess 250 formed in its inner surface communicating with the outer surface 234 of the respective shank portion 38, 40. A pair of bulb lock members 252 are provided respectively positioned in the recesses 250 and pivotally secured to the respective bulb member 50, 52 by a pivot pin 254. In the illustrated embodiment in which three pairs of transversely spaced-apart blade members 256, 258 and 260 are provided and the bulb members 50, 52 thus have four positions, each of the bulb lock members 252 is provided with three notch or step portions 262, 264 and 266 which together with the end 268 of the bulb lock members 252 serve to latch the bulb members in their four positions by engagement respectively with the inner ends 270 of openings 272 in the shank portions 38, 40, as shown.

Each of the shank portions 38, 40 has opening 272 formed therethrough communicating between its inner surface and its outer surface 234 in which a releasing member 274 is slidably positioned, as shown. Push rod 244 has a cam portion 276 formed thereon which extends through the respective releasing member 274, as shown. The end of the cam portion 276 of push rod 244 engages the head 278 of a pin 280 which extends through recess 282 in the shank portion 38, as shown. Pin 280 is biased toward the position shown in turn biasing the push rod gular cross-section, and a second position with said straight surface defining with said surface of said part and the end turns of said one coil another radially outwardly facing slot for accommodating and shaping the end turns of a larger pitched one of said coils into generally rectangular cross-section whereby the end turns of the coils of progressively greater pitch are positioned in axial alignment during the winding thereof.

5. In combination, an end turn-shaping device for a gun-type winding machine for winding at least two concentric coils of different pitch into an internally slotted dynamoelectric machine stator core member having a flat end face, said device comprising a member having means for securing the same to said core member and an elongated part extending axially outwardly from said end face, said part having a radially outwardly facing surface, a shaping member spaced from said end face having a straight surface parallel with said end face, and means mounting said shaping member on said part for selective axial movement between at least a first position with said straight surface defining with said surface of said part a first radially outwardly facing slot adjacent said end face for accommodating and shaping the end turns of the smaller pitched one of said coils into generally rectangular cross-section, and a second position with said straight surface defining with said surface of said part and the end turns of said one coil another radially outwardly facing slot for accommodating and shaping the end turns of a larger pitched one of said coils into generally rectangular cross-section whereby the end turns of the coils of progressively greater pitch are positioned in axial alignment during winding thereof; and wire deflecting means extending axially outwardly over said shaping member in both positions thereof and spaced radially outwardly therefrom for deflecting the wire forming said end turns into said slots.

6. The combination of claim 5 wherein said deflecting means comprises an elongated leaf spring element.

7. A shroud device for a gun-type winding machine for winding at least two concentric coils of different pitch into an internally slotted dynamoelectric machine stator core member having an end face, said device comprising a member having means for securing the same to said core member and an elongated shank portion extending axially outwardly from said end face, said shank portion having a width less than the pitch of the smaller of said coils, at least one axially relatively thin blade member secured to said shank portion and extending radially outwardly therefrom parallel with and axially spaced from said end face, a bulb member having a straight surface parallel with said end face, said bulb member having a cavity formed therein communicating with said straight surface, and means mounting said bulb member on said shank portion for selective axial movement thereon between at least a first position with said blade member positioned in said cavity and said straight surface defining with the radially outer surface of said shank portion a first radially outwardly facing slot adjacent said end face for accommodating and shaping the end turns of the smaller pitched one of said coils into generally rectangular cross-section, and a second position with said straight surface spaced axially outwardly from said blade member and defining with said radially outer surface of said shank portion and blade member another radially outwardly facing slot for accommodating and shaping the end turns of a larger pitched one of said coils into generally rectangular cross-section whereby the end turns of the coils of progressively greater pitch are positioned in axial alignment during winding thereof.

8. A shroud device for a gun-type winding machine for winding at least two concentric coils of different pitch into an internally slotted dynamoetlectric machine stator core member having a flat end face, said device comprising a support member having a flat radially outwardly extending portion adapted to extend parallel with said end face for securing said support member to said core and an elongated shank portion extending axially outwardly from said flat portion, said flat and shank portions having a width less than the pitch of the smaller of said coils, at least one axially relatively thin blade member secured to said shank portion and extending radially outwardly therefrom parallel with and axially spaced from said flat portion, a bulb member having a flat surface parallel with said flat portion, said bulb member having a cavity formed therein communicating with said flat surface, means mounting said bulb member on said shank portion for selective axial movement theron between at least a first position with said blade member positioned in said cavity and said flat surface defining with the radially outer surface of said shank portion and said flat portion a first radially outwardly extending slot for accommodating and shaping the end turns of the smaller pitched one of said coils into generally rectangular cross-section, and a second position with said flat surface spaced axially outwardly from said blade member and defining with said radially outer surface of said shank portion and said blade member another radially outwardly facing slot for accommodating and shaping the end turns of a larger pitched one of said coils into generally rectangular cross-section whereby the end turns of the coils of progressively greater pitch are positioned in axial alignment during winding thereof, a leaf spring member extending axially outwardly over said bulb member in both positions thereof, said spring member being spaced radially outwardly from said bulb member and being inclined radially outwardly toward its end away from said bulb member thereby to deflect the wire forming said end turns into said slots, and means mounting said spring member on said flat portion.

9. An end turn-shaping and positioning device for a winding machine for winding coils into an internally slotted dynamoelectric machine core member having opposite end faces, said device comprising a member including means for securing the same in fixed relationship with respect to said core member and having parts respectively extending axially outwardly from said end faces, said parts respectively having radially outwardly facing surfaces, movable means respectively on said parts and forming with said surfaces radially outwardly facing slots of adjustable axial width respectively adjacent said end faces for accommodating and shaping the end turns of each of said coils into generally rectangular cross-section during winding thereof, and means for simultaneously moving said movable means thereby simultaneously to vary the axial width of said slots.

10. The device of calim 9 wherein said moving means includes means interconnecting said movable means.

11. An end turn-shaping and positioning device for a winding machine for winding at least two concentric coils of different pitch into an internally slotted dynamoelectric machine stator core member having opposite end faces, said device comprising a member having means for securing the same to said core member and elongated parts respectively extending axially outwardly from said end end faces, a pair of shaping members each having a straight surface parallel with the respective end face, means respectively mounting said shaping members on said parts for axial movement between at least first positions with said straight surfaces defining with said parts first radially outwardly facing slots respectively adjacent said end faces for accommodating and shaping the end turns of the smaller pitched one of said coils into generally rectangular cross-section, and second positions with said straight surfaces defining with said parts and the end turns of said one coil at each said end face second radially outwardly facing slots for accommodating and shaping the end turns of a larger pitched one of said coils into generally rectangular cross-section whereby the end turns of the coils of progressively greater pitch are positioned in axial alignment, means for latching said shaping members in said first positions thereof, means respectively urging said shaping members toward said second positions thereof, and selectively actuable means for releasing said latching means.

12. In combination with the device of claim 11 means adapted to be supported on said machine and having a selectively movable element for operatively engaging said actuable means.

13. A shroud device for a gun-type winding machine for winding at least two concentric coils of different pitch into an internally slotted dynamoelectric machine stator core member having opposite end faces, said device comprising a supporting member having a center portion adapted to extend through the bore of said core member and means for securing said supporting member to said core member, said supporting member having a pair of elongated shank portions respectively joined to said center portion and extending axially outwardly from said end faces, a pair of bulb members each having a straight surface parallel with the respective end face, means respectively mounting said bulb members on said shank portions for axial movement between at least first positions with said straight surfaces defining with the radially outer surfaces of said shank portions first radially outwardly facing slots respectively adjacent said end faces for accommodating and shaping the end turns of the smaller pitched one of said coils into generally rectangular cross-section, and second positions with said straight surfaces defining with said radially outer surfaces of said shank portions and the end turns of said one coil at each said end face second radially outwardly facing slots for accommodating and shaping the end turns of the larger pitched one of said coils into generally rectangular cross-section whereby the end turns of the coils of progressively greater pitch are positioned in axial alignment during winding thereof, means respectively mounted on said bulb members and cooperating with the respective shank portions for latching said bulb members in said first positions thereof, spring means for simultaneously urging said bulb members toward said second positions thereof, and selectively actuable means carried by said supporting member for simultaneously releasing said latching means.

14. The device of claim 13 wherein each of said shank portions has an opening formed therethrough between its radially outer and inner surfaces, each of said latching means comprising a leaf spring element having a portion secured to the respective bulb member and an end normally adapted to engage the axially outer wall of the respective opening when the bulb member is in its first position; and wherein said releasing means comprises a pair of leaf spring members respectively having a portion secured to the radially inner surfaces of said shank portions and an end extending into the respective opening and normally spaced from the end of the respective latching means leaf spring element when the respective bulb member is in said first position thereof, and an axially elongated sliding member carried on the radially inner surface of said shank and center portions and axially movable between first and second positions, said sliding member in said second position thereof biasing said pair of leaf spring members so that the ends thereof respectively engage the ends of said latching means leaf spring elements thereby biasing the same out of engagement with the respective wall whereby said spring means moves said bulb members to said second positions thereof.

15. The device of claim 13 wherein each of said shank portions has an opening formed therethrough, each of said latching means comprising a leaf spring element having an intermediate portion secured to the respective bulb member with one end normally adapted to engage the axially outer wall of the respective opening when the bulb member is in its first position and with the other end extending radially inwardly in the respective opening, said center portion having a cavity therein communicating respectively with said shank portions openings, and wherein said spring means comprises a spring in said cavity and members respectively engaging the ends of said spring and said other ends of said leaf spring elements.

16. In combination with the device of claim 13 hydraulic cylinder means adapted to be supported on said machine and including an axially movable actuating element normally spaced axially from one end of said shroud device and adapted to be moved to engage said selectively actuable means for actuating the same.

17. The combination of claim 13 wherein said straight surface of each of said bulb members is flat and has a pair of recesses formed therein respectively on either side of the respective latching means, and wherein each of said shank portions has at least one pair of axially thin blade members on its radially outer surface and extending radially outwardly therefrom, said blade members being located in the respective recesses when said bulb members are in said first position thereof.

18. The device of claim 13 wherein each of said bulb members has a recess formed therein communicating with the respective shank portion, each of said shank portions having an opening formed therethrough communicating with the respective recess; each of said latching means comprising a locking member mounted in the respective recess for pivotal movement between first and second positions, and resilient means biasing each of said locking members to said first position thereof, each of said locking members having a portion adapted in the first position thereof to engage the axially outer wall of the respective opening when the respective bulb member is in its first position; and wherein said releasing means comprises a pair of releasing members respectively slidably mounted in said openings for movement between first and second positions, said releasing members in said first positions thereof being out of engagement with the respective locking member and in their said second positions respectively engaging and moving said locking members to said second positions thereof out of engagement with the respective opening wall, and elongated movable means on said supporting member and selectively axially movable between first and second positions, said movable means having cam portions thereon respectively cooperating with said releasing members to move the same to their second positions responsive to movement of said movable means to said second position whereby said spring means moves said bulb members to the second positions thereof.

19. End turn-shaping and positioning apparatus for a winding machine for winding coils into an internally slotted dynamoelectric machine core member having an end face, said apparatus comprising a member including means for securing the same in fixed relationship with respect to said core member and having a part extending axially outwardly from said end face, said part having a radially outwardly facing surface, shaping means on said part spaced from said end face and defining with said surface of said part a radially outwardly facing slot adjacent said end face for accommodating and shaping the end turns of said coils during the winding thereof, and means for selectively adjusting the axial position of said shaping means on said part with respect to said end face thereby to vary the axial width of said slot.

20. End turn-shaping and positioning apparatus for a winding machine for winding at least two concentric coils of different pitch into an internally slotted dynamoelectric machine core member having an end face, said apparatus comprising a member having means for securing the same to said core member and an elongated part extending axially outwardly from said end face, said part having a radially outwardly facing surface, shaping means supported on said part spaced from said end face and defining with said surface of said part a radially outwardly facing slot adjacent said end face for shaping the end turns of each coil into generally rectangular cross-section and positioning the end turns of the coils of progressively greater pitch in axial alignment during the winding thereof, and means for selectively adjusting the axial position of said shaping means on said part with respect to said end face thereby to vary the axial width of said slot.

References Cited by the Examiner

UNITED STATES PATENTS

| | | | |
|---|---|---|---|
| 2,738,136 | 3/1956 | Bugg | 242—1.1 |
| 2,743,508 | 5/1956 | Isaacson | 29—155.57 |
| 2,845,694 | 8/1958 | LeTourneau | 29—155.57 |
| 2,923,484 | 2/1960 | Roberts | 242—1.1 |
| 2,936,961 | 4/1960 | Roberts | 242—1.1 |
| 2,988,291 | 6/1961 | Greene et al. | 242—1.1 |
| 3,025,008 | 3/1962 | Nill et al. | 242—1.1 |

FOREIGN PATENTS 152,366   4/1932   Switzerland.

MERVIN STEIN, *Primary Examiner.*

B. S. TAYLOR, *Assistant Examiner.*